United States Patent [19]
Ladin

[11] 3,770,991
[45] Nov. 6, 1973

[54] HIGH SPEED AIR PRESSURE SENSITIVE SEAL AND BEARING SYSTEM

[75] Inventor: Eli M. Ladin, Ann Arbor, Mich.

[73] Assignee: Federal-Mogul Corporation, Southfield, Mich.

[22] Filed: Feb. 29, 1972

[21] Appl. No.: 230,305

[52] U.S. Cl. .......................... 308/187.1, 415/170 A
[51] Int. Cl. ............................................ F16c 33/78
[58] Field of Search .................... 308/187.1, 187.2, 308/36.3; 277/94, 95, 27; 415/170 A, 173 A

[56] References Cited
UNITED STATES PATENTS

| | | |
|---|---|---|
| 3,614,256 | 10/1971 | Sieghartner .................... 415/170 A |
| 2,755,113 | 7/1956 | Baumheckel .................... 308/187.2 |
| 2,967,743 | 1/1961 | Howe .............................. 308/187.1 |
| 3,368,853 | 2/1968 | Van Wyk et al. ................ 308/187.2 |
| 3,455,615 | 7/1969 | Stella ............................. 308/187.1 |

FOREIGN PATENTS OR APPLICATIONS

| | | |
|---|---|---|
| 784,928 | 10/1957 | Great Britain ................. 415/170 A |
| 1,173,341 | 7/1964 | Germany ....................... 415/170 A |

Primary Examiner—Charles J. Myhre
Assistant Examiner—Barry Grossman
Attorney—J. King Harness et al.

[57] ABSTRACT

A double row bearing assembly which contains a special air pressure sensitive seal and a shaft supported by the bearing assembly with the shaft in operating usage being rotated at very high speeds.

6 Claims, 5 Drawing Figures

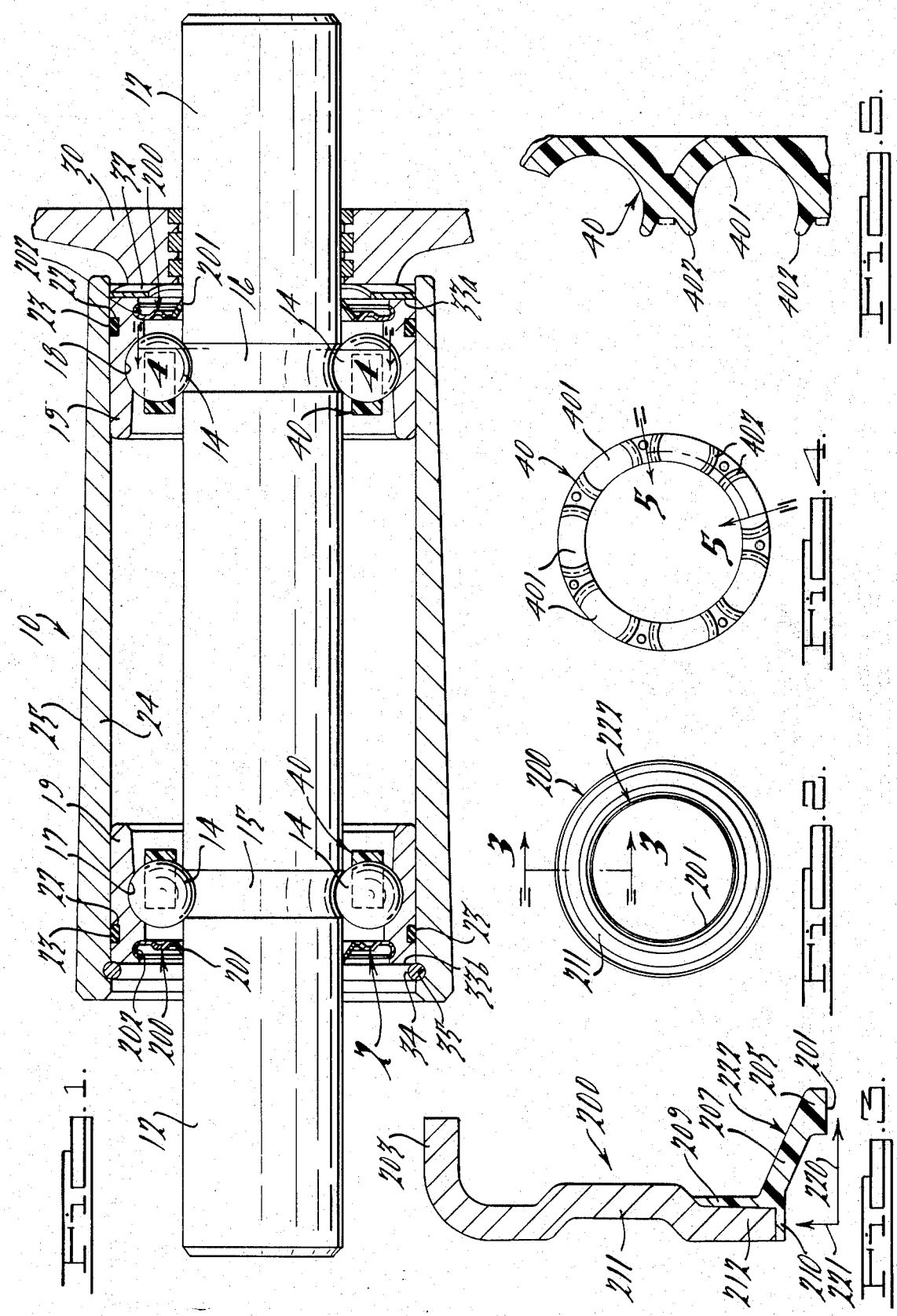

3,770,991

HIGH SPEED AIR PRESSURE SENSITIVE SEAL AND BEARING SYSTEM

BACKGROUND OF THE INVENTION

This invention broadly relates to a new bearing assembly. More particularly, this invention relates to a novel bearing assembly and sealing system for operationally contacting a shaft which in usage rotates at very high speeds.

Accordingly, one object of the present invention is to provide a new bearing system. Another specific object of the invention is to provide a novel high speed air pressure sensitive seal and bearing assembly. Other objects, features, and advantages of the present invention will become apparent from the subsequent description and the appended claims taken in conjunction with the accompanying drawings wherein like numerals in different drawing figures indicate like elements.

SUMMARY OF THE INVENTION

The bearing assembly system described herein has been discovered to be particularly useful as a bearing mounting for use in air pumps or turbines wherein a shaft of the air pump or turbine system must necessarily rotate at very high speeds, for example on the order of 10,000 up to about 25,000 rpm. Accordingly the bearing mounting provided for such usage must not only be capable of maintaining the required high speed operation, but also due to the high rate of air flow around the bearing system and the varying air pressure gradients involved a special sealing system is necessitated, to prevent blow out of lubricating material or grease held within the bearing system and to prevent dire, dust, particles, etc., from getting into the bearing system. Also because of the high speeds of operation involved an effective technique of vibration dampening for the bearing system is highly desirable.

In one aspect, briefly stated, the present invention comprises a double row bearing assembly means for operationally contacting a shaft which in usage rotates at a high rpm, and comprising, shaft means with at least two spaced apart races thereon, a plurality of ball bearings in each of said races, cage means associated with each of said races, outer ring means associated with each of said races and each said cage member, at least two outwardly facing seal member means operative to exert an air pressure sensitive sealing action generally at each end of the shaft and requiring at least atmospheric air pressure to effect the sealing action, each of said seal member means including an outward axially extending ring shaped resilient seal portion operative for providing a sealing action which is responsive to air pressure outside the seal.

BRIEF DESCRIPTION OF THE DRAWINGS

FIG. 1 illustrates a bearing assembly system in accordance with the invention;

FIG. 2 illustrates one view of the special seal indicated by arrow "2" in FIG. 1;

FIG. 3 illustrates a cross sectional view taken along the line 3—3 in FIG. 2;

FIG. 4 illustrates the cage member as viewed from line 4—4 in FIG. 1; and,

FIG. 5 is a sectional view taken along the line 5—5 in FIG. 4.

DESCRIPTION OF PREFERRED EMBODIMENTS

FIGS. 1–5 illustrate the bearing assembly generally designated 10 and being comprised of a shaft 12, a plurality of ball bearings 14 mounted for movement on two inner races 15 and 16 positioned or formed in the shaft 12. The bearings 14 are separated by the cage or retainer means designated 40 (separately shown in FIGS. 4–5).

Outer races 17 and 18 which cooperate respectively with the inner races 15, 16 are formed on the inside surface of the outer ring members designated 19. The outer rings 19 also include an annular recess or collar portion designated 22 within which a compressible sealing ring 23 is positioned. The rings 23 are compressed due to radial pressure applied by the housing 24 which is dimensioned to slip fit over the outer rings 19, thus compressing the rings 23 for reasons to be explained hereinbelow. Note that the outside surface 25 of the housing 24 may be tapered if desired to obtain proper air flow characteristics over the bearing assembly.

The right hand end of the bearing assembly 10 is positioned adjacent to a blade structure or vane 30 which may form a portion of an air pump or turbine (not shown). Adjacent the member 30 is a preloading spring 32 which is biased into a tensioned position when the end 33a of the outer ring 19 is pressed against the preloading spring 32. The opposite end 33b of the left hand outer ring 19 once properly positioned is held in place by a snap ring 34. The snap ring 34 is positioned within the annular recess 35 formed on the inside of the housing 24.

A specially constructed and specially operative seal member designated 200 is positioned generally at each end of the shaft 12 in order to seal off the interior workings of the bearing assembly from undesired dirt, dust, particles, etc. The seal member 200 possesses a special sealing contact surface designated 201 (explained more fully below), and the seal member 200 is held in position by tight fitting engagement within the annular recess 202 with said recess 202 being formed in the outer ring 19. The end portion 203 of the seal member 200 is designed to make said tight fitting mating engagement within the recess 202 in order to hold the seal member 200 in its position generally at each end of the shaft 12 in order to seal off the interior workings of the bearing assembly 10.

Passing now to the detailed construction of seal member 200 shown in FIGS. 2 and 3, the circular sealing contact surface 201 is formed by a hammer head seal portion 205 with the hammer head portion being supported by an axially elongated cantilevered lip member 207. The cantilevered lip member 207 is supported by rubber base portion 209–210 with the base portion being adhered or bounded, or otherwise suitably affixed to a metal supporting ring 211 at the portion thereof designated 212. The metal ring portion 211 of the seal member 200 may suitably be formed by a metal stamping operation or otherwise.

It is to be noted that the hammer head sealing surface 201 (FIG. 3) is significantly dimensionally offset along an axial dimension line indicated by arrow 220 relative to the transverse or radial axis of the metal ring 211 as indicated by the radial axis dimension line shown by arrow 221. This feature of the invention discovered and disclosed herein has led to the finding that the sealing action effected by sealing surface 201 is such that the sealing action is responsive to air pressure or pressure gradient built up just outside the seal member 200. This operative result is possible because the cantilevered lip 207 which supports the sealing surface 201 is readily and easily flexible in response to air pressure exerted outside the seal member 200, and yet the sealing surface 201 is continually in contact with the shaft 12 because of a very slight interference fit therewith. Accordingly the pressure exerted between sealing surface 201 and shaft 12 is sufficient at all times to effect the sealing operation, but it is not allowed to be maintained at a continually high magnitude of sealing pressure which would in effect cause burn out of the seal at the high operating speeds of the shaft 12.

FIGS. 4 and 5 show in a more detailed form the retainer or cage member 40 of FIG. 1. The cage member may be made of any suitable material such as metal, rubber, or plastic. The cage member 40 is comprised of a plurality of pockets designated 401 within which pockets the bearings 14 are positioned. The bearings 14 are inserted into the pockets 401 generally by means of a snap fit insert through the end portions 402 (see FIG. 5). Other types of retainer or cage member constructions may satisfactorily be used rather than the presently preferred construction as shown in FIGS. 4-5.

The advantages of the invention should be fairly apparent from the disclosure above. However, it should also be referred to that the bearing assembly system discovered and disclosed herein is particularly advantageous in connection with bearing support of shafts used in air pumps, turbines, or the like, where the shaft rotates at high speeds in the order of between about 10,000 and about 25,000 rpm. Further, the bearing assembly herein is particularly advantageous for its intended application because the compressible sealing ring described above has radial pressure applied thereto by the housing member to thus assist in preventing rotational movement of the outer ring and to assist in vibration dampening. Still further, the inventive bearing assembly discovered and disclosed herein utilizes a resilient seal portion which contains an axially elongated cantilevered lip member with a circular radial contacting sealing surface at the end thereof and this has been found to make possible a sealing action which is responsive to air pressure outside the seal. Moreover, this sealing action is also brought about due to the fact that the resilient seal portion is cantilevered for support at an angle between about 20° to about 30° relative to the longitudinal axis of the seal member.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A bearing assembly means for operationally contacting a shaft which in usage rotates at a high rpm, and comprising, shaft means with race thereon, a plurality of high speed anti-friction bearings associated with the race cage means associated with the race, outer ring means associated with the race and cage member, at least one outwardly facing seal member means operative to exert an air pressure sensitive sealing action on the shaft and being operative by atmospheric air pressure to effect the sealing action, said seal member means including a metal ring and an outward axially extending ring shaped resilient seal portion operative for providing a sealing action which is responsive to air pressure outside the seal, said resilient seal portion having its one end anchored to the metal ring, and its other sealing end angularly offset and cantilevered from the anchored end, and with the axial length to the sealing end being substantially greater than the radial height to the anchored end to thereby provide for cantilevering.

2. The bearing assembly means of claim 1 wherein, said shaft in general usage rotates between about 10,000 and about 25,000 rpm.

3. The bearing assembly means of claim 1 wherein, said resilient seal portion is cantilevered for support at an angle between about 20° to about 30° relative to the longitudinal axis of the seal member.

4. The bearing assembly means of claim 2 wherein, said resilient seal portion is cantilevered for support at an angle between about 20° to about 30° relative to the longitudinal axis of the seal member.

5. The bearing assembly means of claim 4 wherein, a housing member is slip fitted over said outer ring means.

6. The bearing assembly means of claim 1 wherein, a housing member is slip fitted over said outer ring means.

* * * * *